United States Patent
Johnson (10) Patent No.: US 11,960,731 B2
(45) Date of Patent: Apr. 16, 2024

(54) FIFO MEMORY ERROR CONDITION DETECTION

(71) Applicant: Micron Technology, Inc., Boise, ID (US)

(72) Inventor: Lance P. Johnson, Saint Paul, MN (US)

(73) Assignee: Micron Technology, Inc., Boise, ID (US)

( * ) Notice: Subject to any disclaimer, the term of this patent is extended or adjusted under 35 U.S.C. 154(b) by 85 days.

(21) Appl. No.: 17/831,344

(22) Filed: Jun. 2, 2022

(65) Prior Publication Data

US 2023/0393754 A1 Dec. 7, 2023

(51) Int. Cl.
*G06F 3/06* (2006.01)

(52) U.S. Cl.
CPC .......... *G06F 3/0619* (2013.01); *G06F 3/0653* (2013.01); *G06F 3/0679* (2013.01)

(58) Field of Classification Search
CPC ................ G06F 3/0604; G06F 5/14
See application file for complete search history.

(56) References Cited

U.S. PATENT DOCUMENTS

| | | | |
|---|---|---|---|
| 6,442,646 B1 | 8/2002 | Tsuruta | |
| 6,519,311 B2 | 2/2003 | Cao | |
| 7,203,803 B2 | 4/2007 | Bombal | |
| 7,546,480 B1* | 6/2009 | Swenson | G06F 5/14 713/400 |
| 8,782,355 B1 | 7/2014 | Jain | |
| 2004/0022099 A1* | 2/2004 | Ozawa | G06F 5/14 365/200 |
| 2011/0116337 A1* | 5/2011 | Hay | H03K 5/135 365/194 |
| 2022/0253378 A1* | 8/2022 | Sheffler | G06F 12/023 |
| 2022/0383931 A1* | 12/2022 | Moon | G06F 3/0604 |

* cited by examiner

*Primary Examiner* — Getente A Yimer
(74) *Attorney, Agent, or Firm* — Brooks, Cameron & Huebsch, PLLC (57) ABSTRACT

An apparatus can include first circuitry coupled to a FIFO memory. The first circuitry can provide a write pointer of the FIFO memory at a first rate. Second circuitry can be coupled to the FIFO memory. The second circuitry can provide a read pointer of the FIFO memory at a second rate that is different from the first rate. Third circuitry can be coupled to the first and second circuitries. The third circuitry can provide an indication of an error condition of the FIFO memory based on the write pointer and the read pointer.

23 Claims, 7 Drawing Sheets

FIFO MEMORY ERROR CONDITION DETECTION

TECHNICAL FIELD

The present disclosure relates generally to memory systems, and more particularly, to apparatuses and methods related to first in first out (FIFO) memory error condition detection.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

The present disclosure includes apparatuses and methods related to first in first out (FIFO) memory error condition detection. The term "FIFO memory" is used throughout the present disclosure. However, embodiments of the present disclosure are not limited to any one memory structure to provide FIFO memory functionality and/or to implement FIFO memory. For example, a FIFO memory can include any memory structure configured to store data, such as, but not limited to, registers, flip-flops, and SRAM. Some embodiments of the present disclosure can include a buffer and/or a queue, implemented in hardware, firmware, or software (and combinations thereof), to provide a FIFO memory (or functionality thereof).

Various embodiments include a FIFO memory and associated circuitry configured to detect and/or prevent error conditions. Such error conditions can include overflow and/or underflow associated with the FIFO memory. Overflow (also referred to as FIFO overflow) and/or underflow (also referred to as FIFO underflow) may result in data transmission errors in instances in which the FIFO memory is part of a data transmission link.

FIFO overflow and/or FIFO underflow may occur when reading data from a FIFO memory and writing to the FIFO memory become asynchronous. FIFO overflow and FIFO underflow are non-limiting examples of error conditions that may lead to (result in) data transmission errors. As used herein, "FIFO overflow" refers to an error condition in which data of an entry of a FIFO memory being overwritten with data before the data previous written to that entry is read. FIFO overflow may occur if the write side of a FIFO memory operates at a faster rate than the read side of the FIFO memory. As used herein, "FIFO underflow" refers to an error condition in which data of an entry of a FIFO memory being read again before the data of the entry is overwritten. FIFO underflow may occur if the read side of the FIFO memory runs at a faster rate than the write side of the FIFO memory.

As used herein, errors resulting from FIFO overflow and/or FIFO underflow are provided as examples of asynchronous transmission errors. As used herein, "asynchronous transmission errors" refer to errors that occur when reading data from and/or writing data to a memory becomes "out-of-sync" such that data (e.g., a FIFO entry) is overwritten too soon or too late, for example. Accordingly, embodiments of the present disclosure can provide benefits such as reducing or preventing data transmission errors and/or diagnosing the cause of data transmission errors, for example. Because some embodiments provide advance warning of a potential data transmission error before such an error occurs, measures can be taken to reduce the chances of erroneous data being transmitted or at least mitigate effects of erroneous data transmission sooner than previous approaches that cannot intervene until a data transmission error occurs. In some embodiments, upon detecting potential data transmission error, a data burst can be terminated prematurely to avoid and/or minimize resulting data corruption. In some embodiments, a cyclic redundancy check (CRC) code can be modified (e.g., inverting (poisoning) a CRC code) to provide advance notice to a destination of the data that a retry will be forthcoming to avoid and/or minimize resulting data corruption.

Memory systems can include a serial interface (e.g., a high-speed serial link) via which erroneous data may be transmitted. Memory systems can provide debug features, such as detection of FIFO overflow and/or FIFO underflow, for diagnosing a cause and/or prevention of resultant data transmission errors. Some previous approaches to detecting error conditions of a FIFO memory may include performing a logical AND operation on a write pointer and a read pointer of the FIFO memory. However, previous approaches may require both the write pointer and read pointer to operate at the same frequency or rate and/or have the same structure (e.g., gray code, binary encoding, one-hot encoding). Furthermore, previous approaches may detect an error only after it occurs, which can result in erroneous data being transmitted to and/or from the FIFO memory.

Aspects of the present disclosure address the above and other deficiencies of previous approaches. For instance, some embodiments of the present disclosure enable detection of error conditions before a resultant error occurs. Thus, some embodiments enable intervention (e.g., system-level intervention) to occur in advance of data corruption and/or communication of erroneous data. Some embodiments do not have the limitation of previous approaches that a write pointer clock and a read pointer clock operate at the same frequency. Some embodiments can provide advance error condition detection even though a write pointer clock and a read pointer clock operate at different frequencies. For example, a read pointer value can change (e.g., increment) 4 times for every one change of the write pointer value over a particular period of time. Some embodiments, such as those described in association with FIGS. 3-5B, can include a write pointer (e.g., slow domain) that is one-hot encoded and a read pointer (e.g., fast domain) that is binary encoded. However, embodiments of the present disclosure are not so limited. For instance, some embodiments can include a write pointer (e.g., fast domain) that is binary encoded and a read pointer (e.g., slow domain) that is one-hot encoded.

Implementations of some embodiments can require minimal circuitry additions, which results in minimal increases to power consumption and/or size of a memory system, or interface (I/F) and/or control circuitry thereof. Some embodiments can detect conditions of a FIFO memory that are indicative of FIFO overflow and/or FIFO underflow. As such, error conditions can be identified such that transmission of erroneous data can be prevented and/or mitigated.

As used herein, the singular forms "a," "an," and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The figures herein follow a numbering convention in which the first digit or digits correspond to the drawing figure number and the remaining digits identify an element or component in the drawing. Similar elements or components between different figures may be identified by the use of similar digits. For example, reference number 112 can represent element 12 in FIG. 1, and reference number 312 can represent element 12 in FIG. 3. Analogous elements within a figure may be referenced with a hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
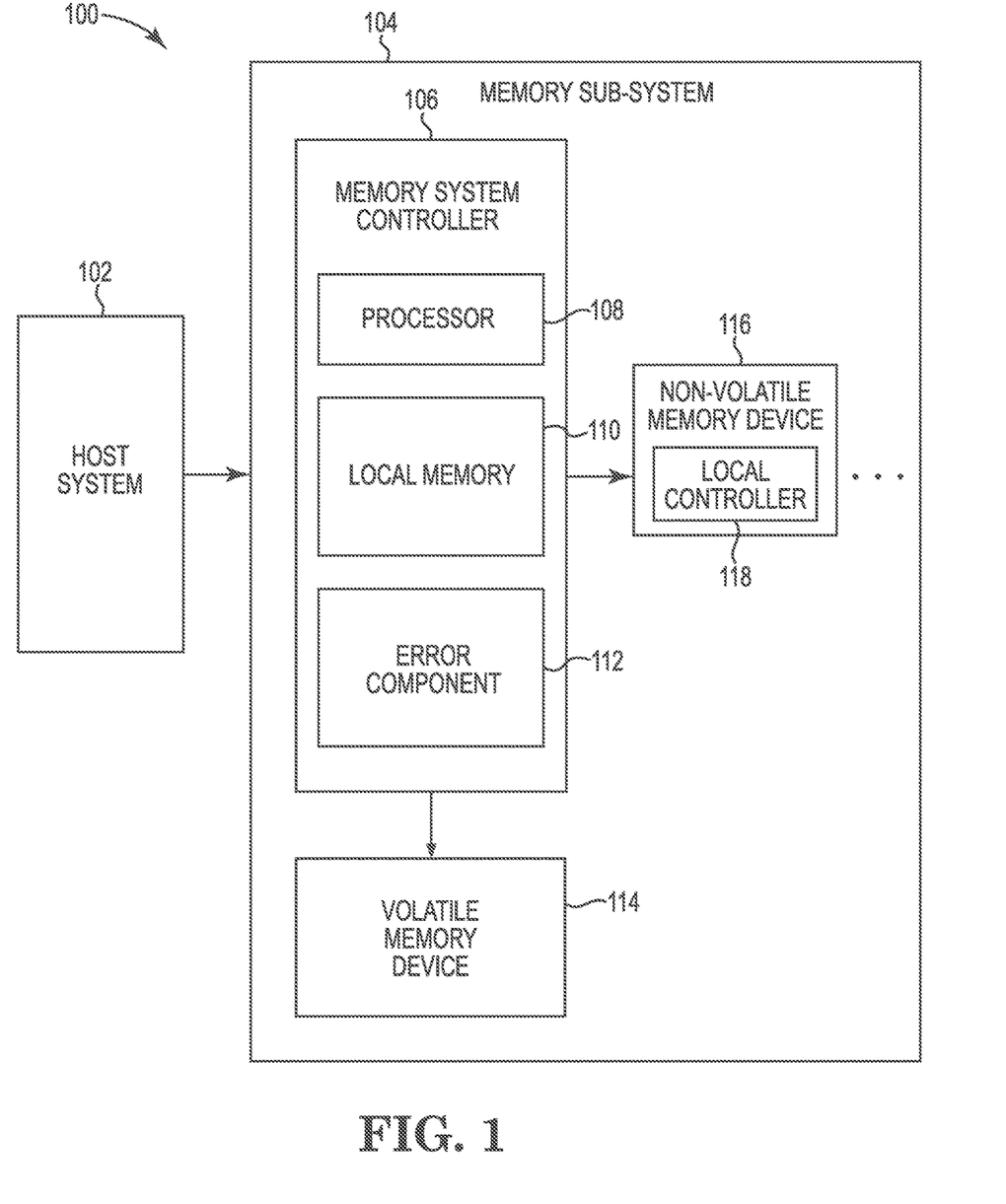
FIG. 1 is a block diagram of a computing system including a memory system in accordance with some embodiments of the present disclosure.

FIG. 1 is a block diagram of a computing system 100 including a memory system 104 in accordance with some embodiments of the present disclosure. The memory system 104 can include media, such as one or more volatile memory devices 114, one or more non-volatile memory devices 116, or a combination of such.

A memory system 104 can be a storage device, a memory module, or a hybrid of a storage device and memory module, among other types of memory systems. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory systems 104. In some embodiments, the host system 102 is coupled to different types of memory systems 104. FIG. 1 illustrates one example of a host system 102 coupled to one memory system 104.

Although not specifically illustrated, the host system 102 can include a processor chipset and a software stack executed by the processor chipset. The processor chipset can include one or more cores, one or more caches, a memory controller (e.g., an SSD controller), and a storage protocol controller (e.g., peripheral component interconnect express (PCIe) interface controller, SATA controller). The host system 102 can write data to and/or read data from the non-volatile memory devices 116 and/or the volatile memory devices 114.

The host system 102 can be coupled to the memory system 104 via a physical host interface (not shown). Examples of a physical host interface include, but are not limited to, serial advanced technology attachment (SATA) interface, PCIe interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports DDR), Universal Flash Storage (UFS) interface, Open NAND Flash Interface (ONFI), Low Power Double Data Rate (LPDDR), or any other interface. The physical host interface can be used to transmit data between the host system 102 and the memory system 104. The host system 102 can further utilize an NVMe interface to access components when the memory system 104 is coupled with the host system 102 by the PCIe interface. The physical host interface can provide an interface for passing control, address, data, and other signals between the memory system 104 and the host system 102. FIG. 1 illustrates a memory system 104 as an example. In general, the host system 102 can access multiple memory systems 104 via a same communication connection, multiple separate communication connections, and/or a combination of communication connections.

The non-volatile memory devices 116 and the volatile memory devices 114 can include various combinations of the different types of non-volatile memory devices and volatile memory devices, respectively. Some examples of volatile memory devices can be, but are not limited to, random access memory (RAM), such as dynamic random-access memory (DRAM) and synchronous dynamic random access memory (SDRAM).

Some examples of non-volatile memory include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

The non-volatile memory devices 116 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, the non-volatile memory devices 116 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the non-volatile memory devices 116 can be grouped as pages that can refer to a logical unit of the respective memory devices used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the non-volatile memory 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Memory system controller 106 (also referred to as control circuitry herein) can communicate with the non-volatile memory devices 116 and/or the volatile memory devices 114 to perform operations, such as reading data, writing data, and/or erasing data stored on the non-volatile memory devices 116 and the volatile memory devices 114, and other such operations. The memory system controller 106 can include hardware such as one or more integrated circuits and/or discrete components, a buffer memory, or a combination thereof. The hardware can include digital circuitry with dedicated (i.e., hard-coded) logic to perform the operations described herein. The memory system controller 106 can be a microcontroller, special purpose logic circuitry (e.g., a field programmable gate array (FPGA), an application specific integrated circuit (ASIC), etc.), or other suitable processor.

The memory system controller 106 can include a processor 108 (e.g., a processing device) configured to execute instructions stored in a local memory 110. In the illustrated example, the local memory 110 of the memory system controller 106 includes an embedded memory configured to store instructions for performing various processes, operations, logic flows, and routines that control operation of the memory system 104, including handling communications between the memory system 104 and the host system 102.

In some embodiments, the local memory 110 can include memory registers storing memory pointers, fetched data, etc. The local memory 110 can include a FIFO memory. The FIFO memory can be used in conjunction with communicating data to and/or from the memory system 104 (e.g., via a serial interface of the memory system 104). The local memory 110 can also include read-only memory (ROM) for storing micro-code. Although the memory system 104 is illustrated as including the memory system controller 106, in another embodiment of the present disclosure, a memory system 104 does not include a memory system controller 106, and can instead rely upon external control (e.g., provided by an external host, or by a processor or controller separate from the memory system) to access the non-volatile memory devices 116 and/or the volatile memory devices 114.

In general, the memory system controller 106 can receive commands or operations from the host system 102 and can convert the commands or operations into instructions or appropriate commands to achieve the desired access to the non-volatile memory devices 116 and/or the volatile memory devices 114. The memory system controller 106 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the non-volatile memory devices 116. The memory system controller 106 can further include host interface circuitry (e.g., a high speed serial link) to communicate with the host system 102 via the physical host interface. The host interface circuitry can convert the commands received from the host system 102 into command instructions to access the non-volatile memory device 116 and/or the volatile memory device 114 as well as convert responses associated with the non-volatile memory device 116 and/or the volatile memory device 114 into information for the host system 102.

The memory system 104 can also include additional circuitry or components that are not illustrated. In some embodiments, the memory system 104 can include a cache or buffer (e.g., DRAM) and address circuitry (e.g., a row decoder and a column decoder) that can receive an address from the memory system controller 106 and decode the address to access the non-volatile memory device 116 and/or the volatile memory device 114.

In some embodiments, the memory devices (e.g., non-volatile memory device 116) can include a local controller 118 that can operate in conjunction with the memory system controller 106 to execute operations on one or more memory cells of the non-volatile memory device 116. An external controller (e.g., the memory system controller 106) can externally manage the non-volatile memory device 116 (e.g., perform media management operations on the non-volatile memory device 116). In some embodiments, the non-volatile memory device 116 can be a managed memory. Managed memory is raw memory combined with a local controller (e.g., the local controller 118) for media management within the same memory device package. An example of a managed memory device is a managed NAND (MNAND) device.

The memory system 104 can include an error component 112. Although not shown in FIG. 1, the error component 112 can include circuitry to detect error conditions (e.g., FIFO overflow and/or FIFO underflow) indicative of potential data transmission errors (associated with a FIFO memory. The error component 112, or a portion thereof, can be part of a OF circuitry, such as an M-PHY interface described in association with FIG. 2. An example of circuitry of the error component 112 is described in association with FIG. 3. In some embodiments, the error component 112 can include special purpose circuitry in the form of an ASIC, FPGA, state machine, and/or other logic circuitry. The processor 108 (e.g., processing device) can be configured to execute instructions stored in the local memory 110 for performing the operations described herein (e.g., operations corresponding to the error component 112).

Figure 2:
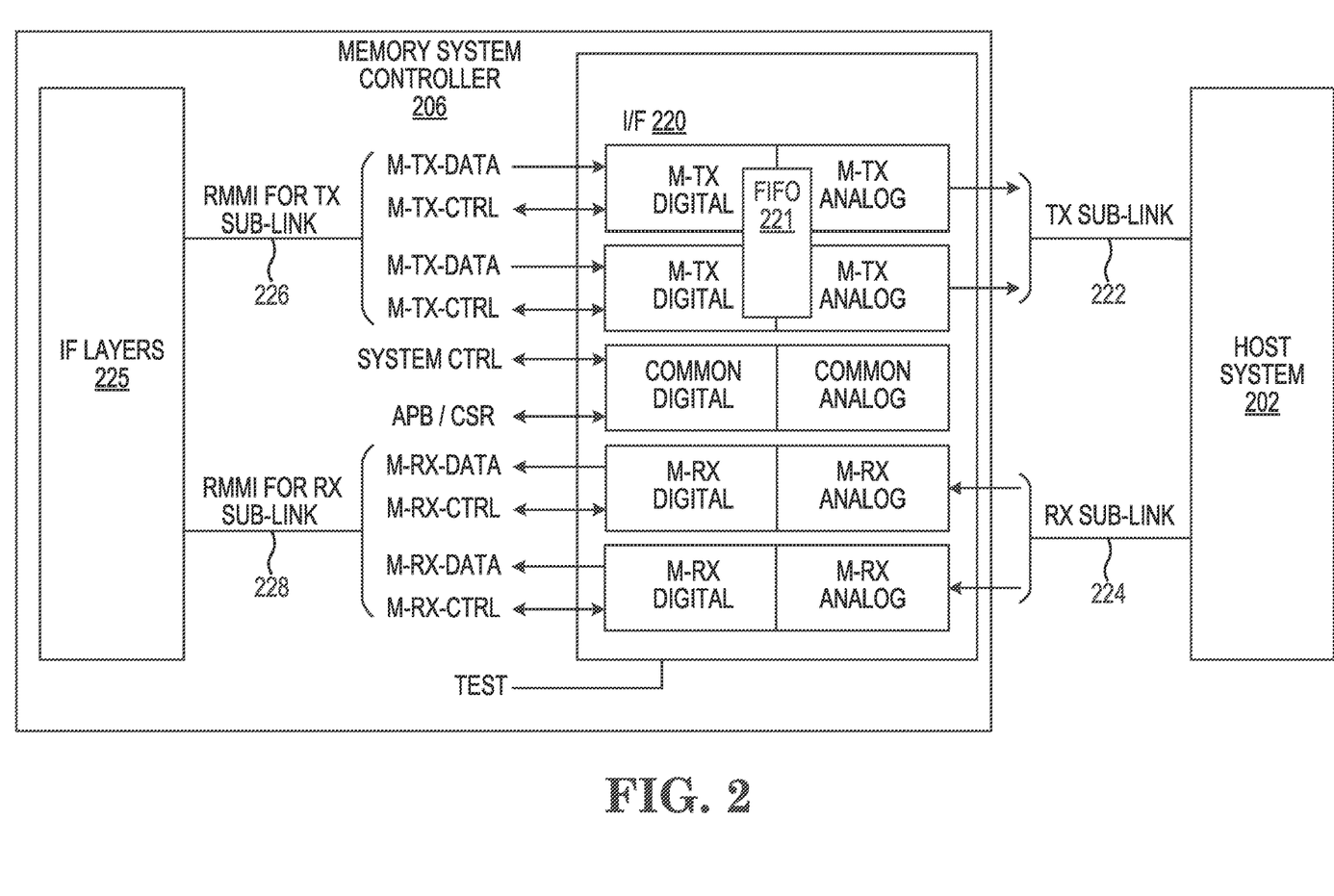
FIG. 2 is a block diagram of a portion of a computing system including a memory system controller in accordance with some embodiments of the present disclosure.

Although not illustrated by FIG. 1, the memory system 106 can include I/F circuitry, such as the I/F circuitry 220 described in association with FIG. 2. The I/F circuitry can couple the host system 102 to the memory system 104 and the memory system controller 106 thereof. In such embodiments, the error component 112 can be a component of the I/F circuitry.

In some embodiments, the memory system controller 106 can generate the write pointer according to a different clock (e.g., a write clock). The memory system controller 106, or the error component 112, can detect FIFO overflow without the FIFO memory experiencing a resultant error. The memory system controller 106, or the error component 112, can detect FIFO within one cycle of the clock preceding an occurrence of a resultant error of the FIFO memory. The memory system controller 106, or the error component 112, can detect FIFO underflow of the FIFO memory without the FIFO memory experiencing an underflow error. The memory system controller 106, or the error component 112, can detect the potential underflow of the FIFO memory within one cycle of the clock preceding an occurrence of an underflow error of the FIFO memory.

FIG. 2 is a block diagram of a portion of a computing system in accordance with some embodiments of the present disclosure. FIG. 2 illustrates only a memory system controller 206 and a host system 202 for ease of illustration and description. The memory system controller 206 and the host system 202 can be analogous to the respective memory system controller 106 and host system 102 described in association with FIG. 1. Although not specifically illustrated, the I/F circuitry 220 can include circuitry of the error component 312 described in association with FIG. 3.

As illustrated by FIG. 2, the memory system controller 206 can be communicatively coupled to the host system 202 via a transmission (TX) sub-link 222 and a receiving (RX) sub-link 224. The memory system controller 206 can include interface (I/F) circuitry 220, which can a be a serial I/F. The I/F 220 can include a physical layer (M-PHY) that includes TX and RX pairs. The I/F circuitry 220 can convert analog signaling to digital signaling (e.g., data, control (CTRL)) and digital signaling to analog signaling. Digital signaling (e.g., Reference M-PHY Module Interface (RMMI)) can be communicated from the I/F circuitry 220 to I/F layers 225 via a TX sub-link 226 and from the I/F layers 225 to the I/F circuitry 220 via a RX sub-link 228. RMMI refers to a control and data interface between an M-PHY layer associated with the IF circuitry 220 and an adapter layer of the I/F layers 225 (e.g., a UniPro protocol stack).

FIG. 2 illustrates a FIFO memory 221 between M-TX digital and M-TX analog pairs of the I/F circuitry 220. However, each M-TX digital and M-TX analog pair of the I/F circuitry 220 can have a respective FIFO memory.

The I/F circuitry 220 can utilize values of a binary-encoded read pointer's values for a current cycle and a subsequent cycle of a read clock to sample values of a one-hot-encoded write pointer. The I/F circuitry 220 can detect FIFO overflow and/or FIFO underflow using two values of the write pointer and a value of the read pointer, for example. In some embodiments, the memory system controller 206, or the I/F circuitry 220 thereof, can generate a write pointer for a FIFO memory 221 according to one-hot encoding and generate a read pointer for the FIFO memory 221 according to binary encoding. The I/F circuitry 220 can detect overflow of the FIFO memory 221 based on a first value of the write pointer corresponding to a current cycle of a clock (e.g., a read clock) and a value of the read pointer. The I/F circuitry 220 can detect underflow of the FIFO memory 221 based on a second value of the write pointer corresponding to a subsequent cycle of the clock and the value of the read pointer.

Figure 3:
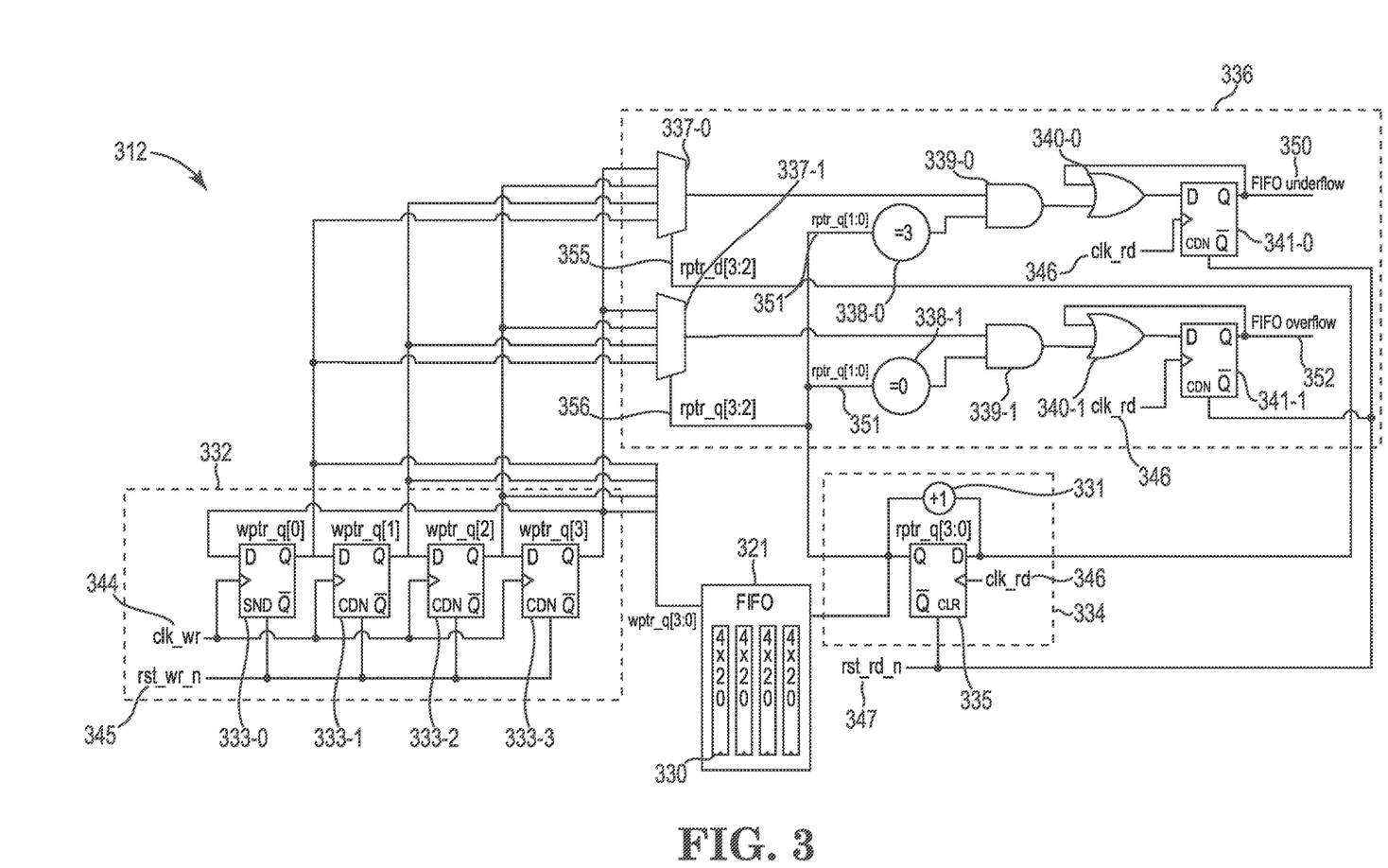
FIG. 3 is a block diagram of an error component in accordance with some embodiments of the present disclosure.

FIG. 3 is a block diagram of an error component 312 in accordance with some embodiments of the present disclosure. The error component 312 and the FIFO memory 310 can be analogous to the error component 112 described in association with FIG. 1. FIG. 3 illustrates the error component 312 as including write pointer circuitry 332, read pointer circuitry 334, and the FIFO memory 321. However, the write pointer circuitry 332, the read pointer circuitry 334, and/or the FIFO memory 321 can be components of the memory system controller 106 and/or external to the memory system controller 106.

In the example of FIG. 3, the FIFO memory 321 includes 4 entries 330, each entry being 20 bits long. The write pointer circuitry 332 includes 4 flip-flops 333-0, 333-1, 333-2, and 333-4 (referred to collectively as the flip-flops 333). Each of the flip-flops 333 receives a write clock (clk_wr) signal 344 and a write reset (rst_wr_n) signal 345. The write pointer circuitry 332 generates a 4-bit long write pointer according to one-hot encoding: 2 bits identifying a particular entry of the entries 330 and 2 bits identifying bits of the particular entry.

The read pointer circuitry 334 includes a single flip-flop 335 and an incrementor 331. The flip-flop 335 receives a read clock (clk_rd) signal 346 and a read reset (rst_rd_n) signal 347. The read pointer circuitry 334 generates a 4-bit long read pointer according to binary encoding: 2 bits identifying a particular entry of the entries 330 and 2 bits identifying bits of the particular entry.

The error component 312 includes detection circuitry 336. The detection circuitry 336 includes 2 multiplexers 337-0 and 337-1. Both the multiplexers 337-0 and 337-1 receive respective inputs from the flip-flops 333 of the write pointer circuitry 332. However, at 355, the multiplexer 337-0 receives the 2 most significant bits (MSBs) of the D input to the flip-flop 335 of the read pointer circuitry 334 (rptr_d[3:2]) as a selector. The D input of the flip-flop 335 is the Q output of the flip-flop 335 incremented by the incrementor 331. At 356, the multiplexer 337-1 receives the 2 MSBs of the Q output of the flip-flop 335 of the read pointer circuitry 334 (rptr_q[3:2]) as a selector. The Q output of the flip-flop 335 is a value of the read pointer corresponding to a current cycle of the read clock signal 346. The D input of the flip-flop 335 is a value of the read pointer corresponding to a subsequent cycle of the read clock signal 346 (as a result of the incrementor 331). Thus, the multiplexer 337-1, in effect, samples the write pointer for the current cycle of the read clock signal 346 and the multiplexer 337-0, in effect, samples the write pointer for the subsequent cycle of the read clock signal 346.

The 2 least significant bits (LSBs) of the Q output of the flip-flop 335 of the read pointer circuitry 334 (rptr_q[1:0]) are input to 2 comparators 338-0 and 338-1. The comparator 338-0 determines whether the LSBs of the Q output of the flip-flop 335 is a (first) particular value to determine whether the current value of the read pointer circuitry 334 is 3 to detect FIFO underflow. As illustrated by FIG. 3, the comparator 338-0 indicates whether the LSBs of the Q output of the flip-flop 335 is 3 (e.g., a 2-bit hex value of 3). The comparator 338-1 determines whether the LSBs of the Q output of the flip-flop 335 is a (second) particular value to determine whether the current value of the read pointer circuitry 334 is 0 to detect FIFO overflow. As illustrated by FIG. 3, the comparator 338-1 indicates whether the LSBs of the Q output of the flip-flop 335 is 0 (e.g., a 2-bit hex value of 0).

The outputs of the multiplexer 337-0 and the comparator 338-0 are input to a logical AND gate 339-0, the output of which is indicative of FIFO underflow. The output of the logical AND gate 339-0 is input to a logical OR gate 340-0. The output of the logical OR gate 340-0 is the D input of a flip-flop 341-0. The flip-flop 340-0 receives the read clock (clk_rd) signal 346 and the read reset (rst_rd_n) signal 347. The Q output of the flip-flop 340-0 is signaling 350 provided by the error component 312 that is indicative of potential FIFO underflow. The Q output of the flip-flop 341-0 is input to the logical OR gate 340-0. This feedback locks in the indication of potential FIFO underflow such that indication of potential FIFO underflow can be captured by destination of the potentially corrupted data. The flip-flop 340-0 can be reset to clear the indication of potential FIFO underflow. If the output of the comparator 338-0 is logical 1 (the LSBs of the Q output of the flip-flop 335 is 3) and the output of the multiplexer 337-0 is logical 1, the output of the logical AND gate 339-0 will be logical 1, causing the signaling 350 to go high. The signaling 350 changing from low to high can indicate that the FIFO memory 321 may experience an error (e.g. a data transmission error).

The outputs of the multiplexer 337-1 and the comparator 338-1 are input to a logical AND gate 339-1, the output of which is indicative of FIFO overflow. The output of the logical AND gate 339-1 is input to a logical OR gate 340-1. The output of the logical OR gate 340-1 is the D input of a flip-flop 341-1. The flip-flop 340-1 receives the read clock (clk_rd) signal 346 and the read reset (rst_rd_n) signal 347. The Q output of the flip-flop 340-1 is signaling 352 provided by the error component 312 that is indicative of FIFO overflow. The Q output of the flip-flop 341-1 is input to the logical OR gate 340-1. This feedback locks in the indication of potential FIFO overflow such that indication of potential FIFO overflow can be captured by destination of the potentially corrupted data. The flip-flop 340-1 can be reset to clear the indication of potential FIFO overflow. If the output of the comparator 338-1 is logical 1 (the LSBs of the Q output of the flip-flop 335 is 0) and the output of the multiplexer 337-1 is logical 1, the output of the logical AND gate 339-1 will be logical 1, causing the signaling 352 to go high. The signaling 352 changing from low to high can indicate that the FIFO memory 321 may experience an error (e.g. a data transmission error).

Figure 4A:
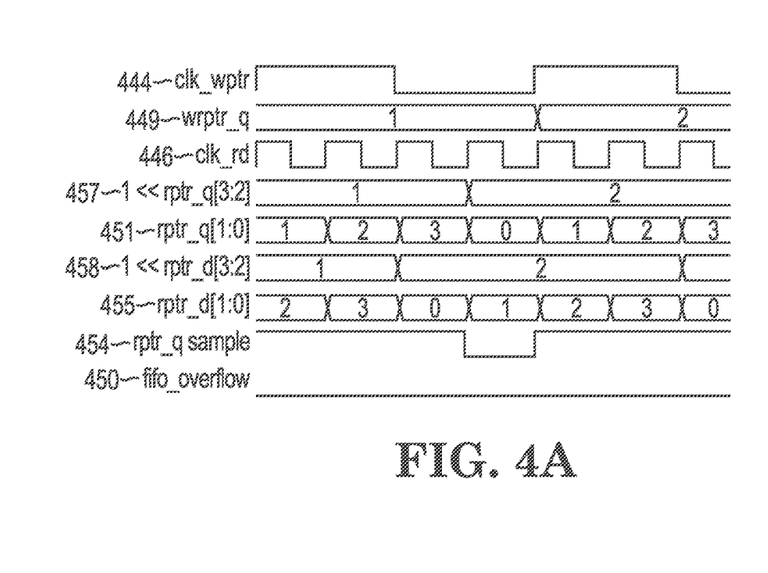
FIGS. 4A-4B are timing diagrams of signaling provided by an error component in accordance with some embodiments of the present disclosure.
Figure 4B:
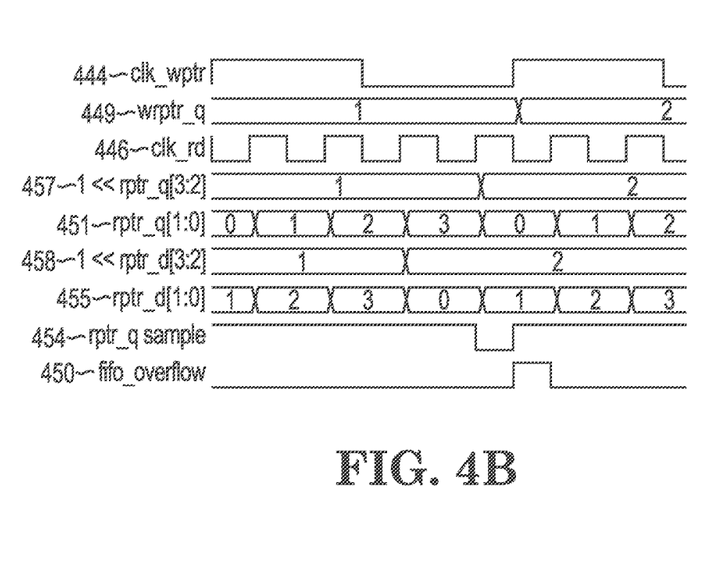

FIGS. 4A-4B are timing diagrams of signaling 450 provided by the error component 312 described in association with FIG. 3 in accordance with some embodiments of the present disclosure. To visualize example FIFO overflow conditions, FIGS. 4A-4B include signals with "1<<" that indicates that the value to the right of the "<<" is shifted left by 1. This shift transforms a binary encoded pointer to a one-hot pointer. The signal 457 is the 2 MSBs of the Q output of the flip-flop 355 of the read pointer circuitry 334 (rptr_q[3:2]) shifted left by 1. The signal 458 is the 2 MSBs of the D output of the flip-flop 355 of the read pointer circuitry 334 (rptr_d[3:2]) shifted left by 1.

In FIG. 4A, the FIFO memory 321 is nearing overflow. The signaling 454 indicates, by going low for a whole cycle of the read clock (clk_rd) 446, that a change of the value of the MSBs of the read pointer 445 from 1 to 2 is separated by a whole cycle of the read clock (clk_rd) 446 from a change of the value of the write pointer 449 from 1 to 2.

In FIG. 4B, however, the signaling 454 indicates, by going low for less than a whole cycle of the read clock (clk_rd) 446, that a change of the value of the signal 458 from 1 to 2 is separated by less than a whole cycle of the read clock (clk_rd) 446 from a change of the value of the write pointer 449 from 1 to 2. The last entry of the FIFO memory 321 at location 1, where the signal 451 (rptr_q[1:0])1 transitions from 3 to 0, is read slightly before the entry is overwritten, where the signal 449 (wptr_q) transitions from 1 to 2. This difference, or window, is indicative of potential FIFO overflow and enables advance warning of potential FIFO overflow to be provided. Accordingly, FIG. 4B illustrates the signaling 450 going high, indicating overflow of the FIFO memory 321 in advance of a resultant error actually occurring (e.g., data being read again before the data has been overwritten).

Figure 5A:
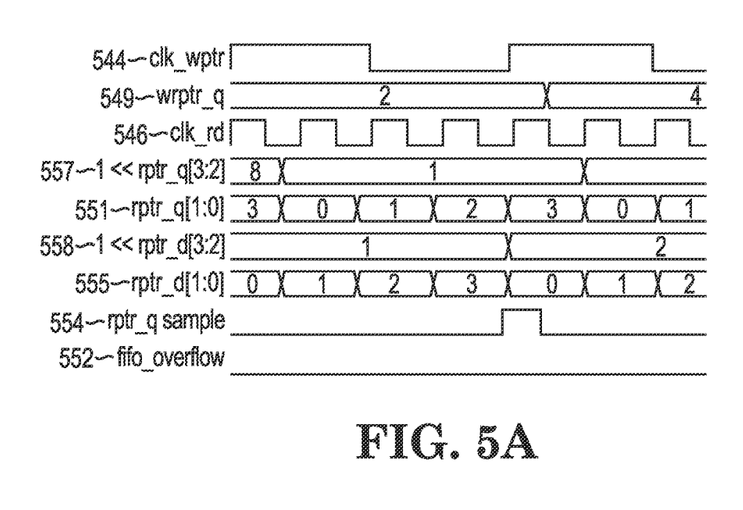
FIGS. 5A-5B are timing diagrams of signaling provided by an error component in accordance with some embodiments of the present disclosure.
Figure 5B:
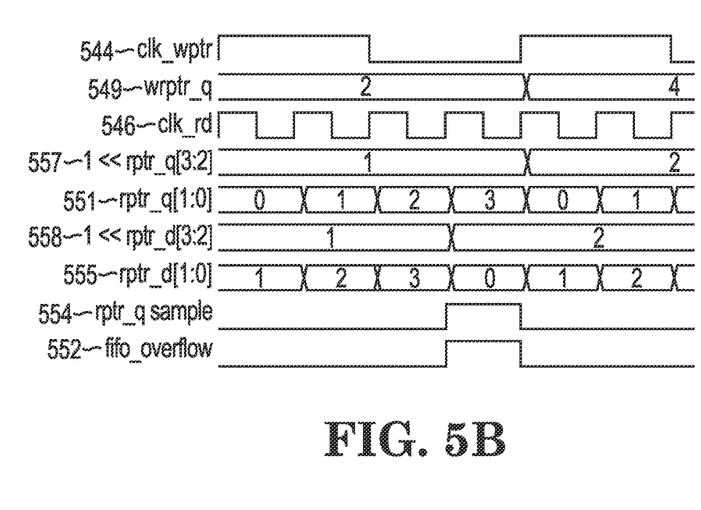

FIGS. 5A-5B are timing diagrams of signaling 552 provided by the error component 312 described in association with FIG. 3 in accordance with some embodiments of the present disclosure. To visualize example FIFO underflow conditions, FIGS. 5A-5B include signals with "1<<" that indicates that the value to the right of the "<<" is shifted left by 1. This shift transforms a binary encoded pointer to a one-hot pointer. The signal 557 is the 2 MSBs of the Q output of a flip-flop of the read pointer circuitry (rptr_q[3:2]) shifted left by 1. The signal 558 is the 2 MSBs of the D output of a flip-flop of the read pointer circuitry (rptr_d[3:2]) shifted left by 1.

In FIG. 5A, the FIFO memory 321 is nearing underflow. The signaling 554 indicates, by going high for less than a whole cycle of the read clock (clk_rd) 546, that a change of the value of the MSBs of the read pointer 547 from 1 to 2 at a subsequent cycle of the read clock (clk_rd) 546 is separated by less than a whole cycle of the read clock (clk_rd) 546 from a change of the value of the write pointer 549 from 2 to 5.

In FIG. 5B, however, the signaling 554 indicates, by going high for a whole cycle of the read clock (clk_rd) 546, that a change of the value of the MSBs of the read pointer 547 for a subsequent cycle of the read clock (clk_rd) 546 changing from 1 to 2 is separated by a whole cycle of the read clock (clk_rd) 546. Location 2 of the FIFO memory 321 is written, where the signal 549 (wptr_q) transitions from 2 to 4, and then is almost immediately read, where the value of the signal 557 is 2 and the signal 551 (rptr_q[1:0]) transitions from 0 to 1. This difference, or window, is indicative of potential FIFO underflow and enables advance warning of potential FIFO underflow to be provided. This is in the window where the early underflow detection flags an error. Accordingly, FIG. 5B illustrates the signaling 552 going high, indicating underflow of the FIFO memory 321 in advance of a resultant error actually occurring (e.g., data being overwritten before the data has been read).

Figure 6:
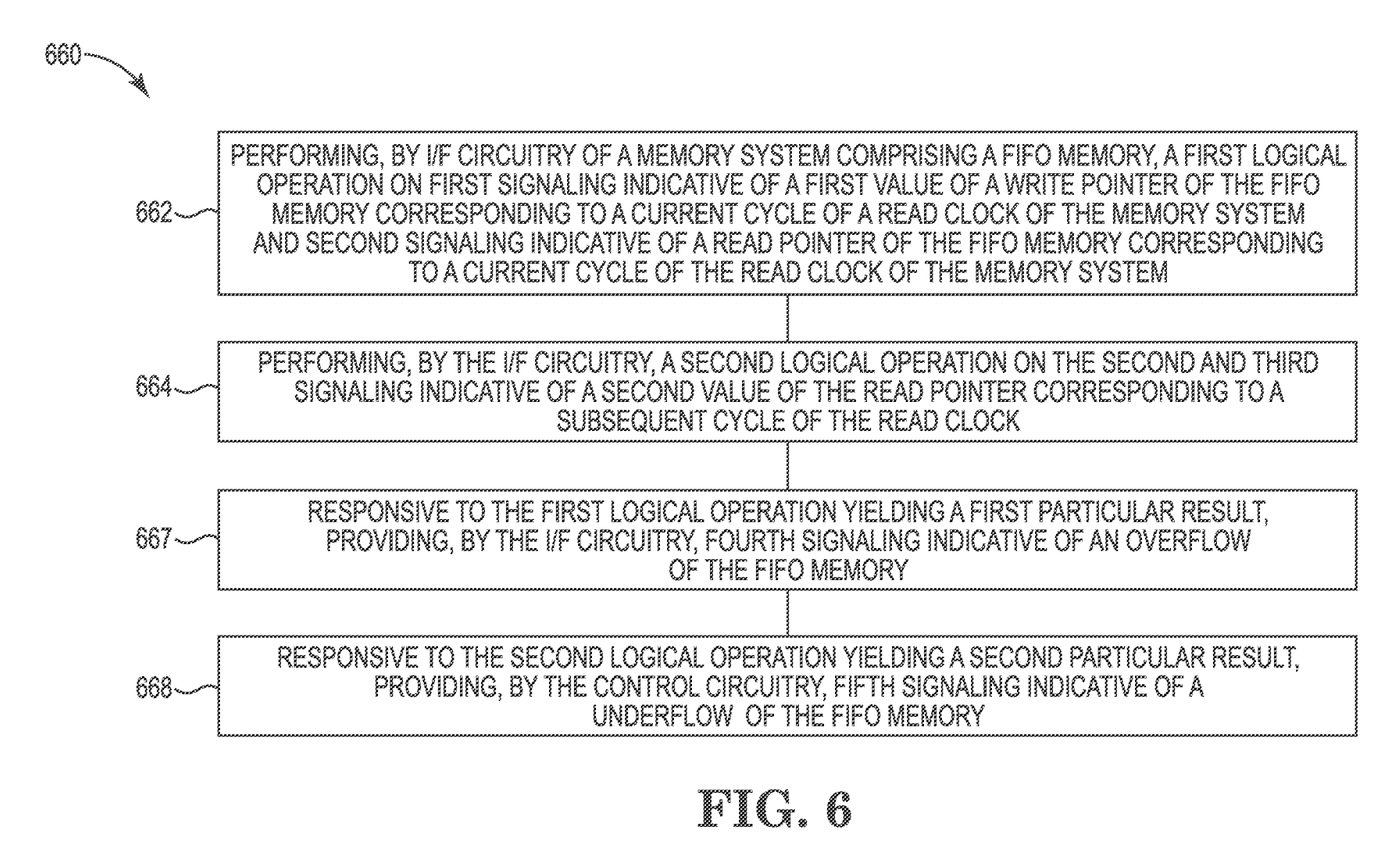
FIG. 6 is a flow diagram of a method for FIFO memory error condition detection in accordance with some embodiments of the present disclosure.

FIG. 6 is a flow diagram of a method 660 for FIFO memory error condition detection in accordance with some embodiments of the present disclosure. Any of the steps and operations of the method 660 can be performed by the memory system controller 106 and/or the error component 112 described in association with FIG. 1, for example.

At 662, the method 660 can include performing, by I/F circuitry of a memory system comprising a FIFO memory, a first logical operation (e.g., a logical AND operation). on first signaling and second signaling. The first signaling can be indicative of a first value of a write pointer of the FIFO memory corresponding to a current cycle of a read clock of the memory system. The second signaling can be indicative of a read pointer of the FIFO memory corresponding to the current cycle of the read clock of the memory system.

At 664, the method 660 can include performing, by the I/F circuitry, a second logical operation (e.g., a logical AND operation) on the second and third signaling. The third signaling can be indicative of a second value of the write pointer corresponding to a subsequent cycle of the read clock. Performing the first and second logical operations can include performing the same type of logical operation.

At 667, the method 660 can include, responsive to the first logical operation yielding a first particular result (e.g., logical "1"), providing, by the I/F circuitry, fourth signaling indicative of overflow of the FIFO memory. At 668, the method 660 can include responsive to the second logical operation yielding a second particular result, providing, by the I/F circuitry, fifth signaling indicative of underflow of the FIFO memory.

Although not specifically illustrated by FIG. 6, the method 660 can include receiving, by the I/F circuitry, the first signaling and the third signaling from the write pointer circuitry of the memory system. The method 660 can include receiving, by the I/F circuitry, the second signaling from read pointer circuitry of the memory system. Receiving the second signaling can include receiving changes of values from the read pointer circuitry at a rate at least four times faster than changes of values from the write pointer circuitry.

Figure 7:
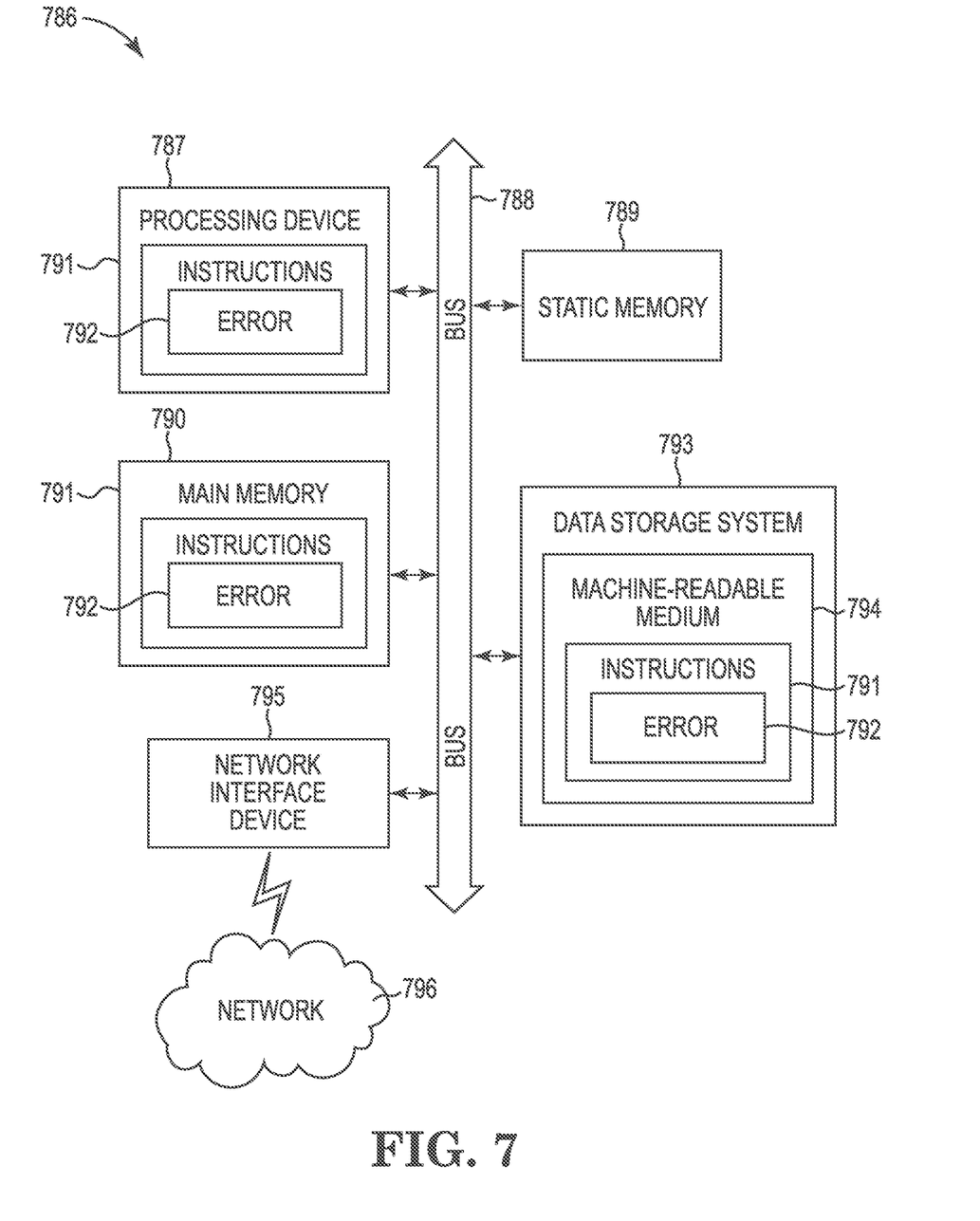
FIG. 7 is a block diagram of a computer system for FIFO memory error condition detection in accordance with some embodiments of the present disclosure.

FIG. 7 is a block diagram of a computer system 786 for FIFO memory error detection in accordance with some embodiments of the present disclosure. The computer system 786 can be a machine within which a set of instructions, for causing the machine to perform any one or more of the methodologies discussed herein, can be executed. In some embodiments, the computer system 786 can correspond to a host (e.g., the host system 102 described in association with FIG. 1) that includes, is coupled to, or utilizes one or more memory devices (e.g., the non-volatile memory devices 116, the volatile memory devices 114) or can be used to perform the operations of a controller (e.g., the memory system controller 106) to execute an operating system to perform operations associated with FIFO memory error condition detection. In alternative embodiments, the machine can be connected (e.g., networked) to other machines in a local access network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 786 includes a processing device 787, a main memory 790 (e.g., ROM, flash memory, DRAM such as synchronous DRAM (SDRAM) or Rambus DRAM (RDRAM), etc.), a static memory 789 (e.g., flash memory, SRAM, etc.), and a data storage system 793, which communicate with each other via a bus 788.

The processing device 787 represents one or more general-purpose processing devices such as a microprocessor, a central processing unit, or the like. More particularly, the processing device 787 can be a Complex Instruction Set Computing (CISC) microprocessor, Reduced Instruction Set Computing (RISC) microprocessor, Very Long Instruction Word (VLIW) microprocessor, or a processor implementing other instruction sets, or processors implementing a combination of instruction sets. The processing device 787 can also be one or more special-purpose processing devices such as an Application Specific Integrated Circuit (ASIC), a Field Programmable Gate Array (FPGA), a Digital Signal Processor (DSP), network processor, or the like. The processing device 787 is configured to execute instructions 791 for performing the operations and steps discussed herein. The computer system 786 can further include a network interface device 795 to communicate over the network 796.

The data storage system 793 can include a machine-readable storage medium 794 (also referred to as a computer-readable medium) on which one or more sets of instructions 791 or software embodying any one or more of the methodologies or functions described herein is stored. The instructions 791 can also reside, completely or at least partially, within the main memory 790 and/or within the processing device 787 during execution thereof by the computer system 786, the main memory 790, and the processing device 787 also constituting machine-readable storage media. In some embodiments, the machine-readable storage medium 794, data storage system 793, and/or main memory 790 can correspond to the non-volatile memory device 116 and/or the volatile memory device 114.

In some embodiments, the instructions 791 can include instructions to implement functionality for FIFO memory error condition detection (represented in FIG. 7 at 792). For instance, the instructions 791 can include instructions to monitor an output of first logical operation circuitry (e.g., logical AND gate, logical OR gate) having current values of a read pointer of a FIFO memory and current values of a write pointer of the FIFO memory as inputs. A change in the output of the first logical operation circuitry can be indicative of overflow of the FIFO memory. The instructions 791 can include instructions to monitor an output of second logical operation circuitry having directly subsequent values of the write pointer and the current values of the read pointer as inputs. A change in the output of the second logical operation circuitry is indicative of underflow of the FIFO memory.

The instructions 791 can include instructions to provide signaling indicative of the overflow in response to detecting that the output of the first logical operation circuitry is high. The instructions 791 can include instructions to provide the signaling indicative of the overflow within a clock cycle associated with the read pointer preceding an occurrence of a resultant data transmission error of the FIFO memory. The instructions 791 can include instructions to provide signaling indicative of the underflow in response to detecting that the output of the second logical operation circuitry is high. The instructions 791 can include instructions to provide the signaling indicative of the underflow within a clock cycle associated with the read pointer preceding an occurrence of a resultant data transmission error of the FIFO memory.

Although the machine-readable storage medium 794 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a first in first out (FIFO) memory;
first circuitry coupled to the FIFO memory and configured to provide a write pointer of the FIFO memory;
second circuitry coupled to the FIFO memory and configured to provide a read pointer of the FIFO memory; and
third circuitry coupled to the first and second circuitries and configured to:
provide a first signaling indicative of whether a first value of the write pointer for a current cycle of a read clock is a first particular value;
perform a first logical operation on the first signaling and second signaling indicative of the read pointer, wherein a result of the first logical operation is indicative of a potential error condition being overflow of the FIFO memory;
provide a third signaling indicative of whether a second value of the write pointer for a subsequent cycle of the read clock is a second particular value; and
perform a second logical operation on the third signaling and the second signaling,
wherein a result of the second logical operation is indicative of the potential error condition being underflow of the FIFO memory.

2. The apparatus of claim 1, wherein the first circuitry is configured to provide the write pointer according to one-hot encoding.

3. The apparatus of claim 1, wherein the second circuitry is configured to provide the read pointer according to binary encoding.

4. The apparatus of claim 1, wherein the third circuitry is configured to:
receive an incremented cycle of the read clock, wherein the incremented cycle is generated by a feedback incrementor that couples an output of a flip-flop in the second circuitry to a data input of the flip-flop, and wherein the incremented cycle is the subsequent cycle of the read clock.

5. The apparatus of claim 4, wherein a value of the output of the flip-flop is a value of the read pointer corresponding to the current cycle of the read clock.

6. The apparatus of claim 4, wherein a value of the input of the flip-flop is the value of the read pointer corresponding to the subsequent cycle of the read clock.

7. The apparatus of claim 6, wherein the second logical operation on the third signaling and the second signaling is performed during the current cycle of the read clock.

8. The apparatus of claim 1, wherein the third circuitry is further configured to provide the indication of the potential error condition of the FIFO memory in advance of an occurrence of a resultant data transmission error of the FIFO memory.

9. A method, comprising:
performing, by interface (I/F) circuitry of a memory system comprising a first in first out (FIFO) memory, a first logical operation on first signaling and second signaling,
wherein the first signaling is indicative of a first value of a write pointer of the FIFO memory corresponding to a current cycle of a read clock of the memory system, and
wherein the second signaling is indicative of a read pointer of the FIFO memory corresponding to the current cycle of the read clock of the memory system;
performing, by the I/F circuitry, a second logical operation on the second and third signaling,
wherein the third signaling is indicative of a second value of the write pointer corresponding to a subsequent cycle of the read clock;
responsive to the first logical operation yielding a first particular result, providing, by the I/F circuitry, fourth signaling indicative of a potential overflow of the FIFO memory; and
responsive to the second logical operation yielding a second particular result, providing, by the I/F circuitry, fifth signaling indicative of a potential underflow of the FIFO memory.

10. The method of claim 9, further comprising:
receiving, by the I/F circuitry, the first signaling and the third signaling from write pointer circuitry of the memory system; and
receiving, by the I/F circuitry, the second signaling from read pointer circuitry of the memory system.

11. The method of claim 10, wherein receiving the second signaling comprises receiving changes of values from the read pointer circuitry at a rate at least four times faster than changes of values from the write pointer circuitry.

12. The method of claim 9, wherein performing the first and second logical operations comprises performing a same type of logical operation.

13. An apparatus, comprising:
a first in first out (FIFO) memory; and
control circuitry coupled to the FIFO memory and configured to:
generate a write pointer for the FIFO memory according to one-hot encoding;
generate a read pointer for the FIFO memory according to binary encoding and a clock;
detect a potential overflow of the FIFO memory based on a first value of the write pointer corresponding to a current cycle of the clock and a value of the read pointer; and
detect a potential underflow of the FIFO memory based on a second value of the write pointer corresponding to a subsequent cycle of the clock and the value of the read pointer.

14. The apparatus of claim 13, wherein the control circuitry is further configured to generate the write pointer according to a different clock.

15. The apparatus of claim 13, wherein the control circuitry is further configured to detect the potential overflow or the potential underflow of the FIFO memory without the FIFO memory experiencing a resultant error.

16. The apparatus of claim 13, wherein the control circuitry is further configured to detect the potential overflow or the potential underflow of the FIFO memory within one cycle of the clock preceding an occurrence of a resultant error of the FIFO memory.

17. The apparatus of claim 13, wherein the control circuitry comprises a flip-flop configured to generate the read pointer.

18. The apparatus of claim 13, wherein the control circuitry comprises a plurality of flip-flops configured to generate the write pointer.

19. A non-transitory medium storing instructions executable by a processing device to:
monitor an output of first logical operation circuitry having current values of a read pointer of a first in first out (FIFO) memory and current values of a write pointer of the FIFO memory as inputs,
wherein a change in the output of the first logical operation circuitry is indicative of a potential overflow of the FIFO memory; and
monitor an output of second logical operation circuitry having directly subsequent values of the write pointer and the current values of the read pointer as inputs,
wherein a change in the output of the second logical operation circuitry is indicative of a potential underflow of the FIFO memory.

20. The medium of claim 19, further storing instructions executable to provide signaling indicative of the potential overflow in response to detecting that the output of the first logical operation circuitry is high.

21. The medium of claim 20, further storing instructions executable to provide the signaling indicative of the potential overflow within a clock cycle associated with the read pointer preceding an occurrence of a resultant data transmission error of the FIFO memory.

22. The medium of claim 19, further storing instructions executable to provide signaling indicative of the potential underflow in response to detecting that the output of the second logical operation circuitry is high.

23. The medium of claim 22, further storing instructions executable to provide the signaling indicative of the potential underflow within a clock cycle associated with the read pointer preceding an occurrence of a resultant data transmission error of the FIFO memory.

* * * * *